Dec. 10, 1968    H. A. BERGGREN    3,415,275

SPOOL-SHAPED DIAPHRAGM ELEMENT FOR PLURAL SEATINGS

Filed Aug. 3, 1967    2 Sheets-Sheet 1

INVENTOR.
HAROLD A. BERGGREN
BY
McCormick, Paulding & Huber
ATTORNEYS

United States Patent Office 3,415,275
Patented Dec. 10, 1968

3,415,275
SPOOL-SHAPED DIAPHRAGM ELEMENT
FOR PLURAL SEATINGS
Harold A. Berggren, Cromwell, Conn., assignor, by mesne assignments, to American Machine & Foundry Company, New York, N.Y., a corporation of New Jersey
Filed Aug. 3, 1967, Ser. No. 665,657
6 Claims. (Cl. 137—556)

ABSTRACT OF THE DISCLOSURE

An elastomeric spool-shaped diaphragm is mounted in the tubular inner portion of a valve housing so that annular segments of its opposite end portions can seat against annular seating surfaces on the tubular portion. The end portions of the diaphragm are flared radially outwardly to define the annular segments, and a central portion thereof defines an axial opening for receiving a valve stem, which stem has oppositely threaded end portions, each of which carries a nut, so that rotation of the stem moves both nuts axially toward one another and against the end portions of the diaphragm to seat said annular segments. Another embodiment provides a single fitting in the valve housing through which air under pressure can be introduced for flexing the flared end portions of the diaphragm to seat the annular segments thereof.

SUMMARY OF INVENTION

This invention relates to valves having a resilient diaphragm which can be deformed so that segments thereof seat against surfaces defined in the valve housing. More particularly, this invention represents an improvement over my prior application entitled "Diaphragm Valve," Serial No. 545,921, filed April 28, 1966. One embodiment of the valve constructions disclosed herein permits the fluid flow to be metered in response to rotation of a hand wheel, while an alternative embodiment permits closing or opening a pair of valve openings in response to the introduction of pressure through a single fitting in the valve housing.

One object of the present invention is to provide a diaphragm valve having a hand wheel mounted on a valve stem for moving the diaphragm between closed and open positions, which valve stem does not require any packing nut or other sealing means.

Another object of the present invention is to provide a valve having two oppositely arranged valve seats against which portions or segments of a single spool-shaped valve element are adapted to seat in response to application of either mechanical or fluid pressure at one side of said valve element.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

DETAILED DESCRIPTION

Figure 1:
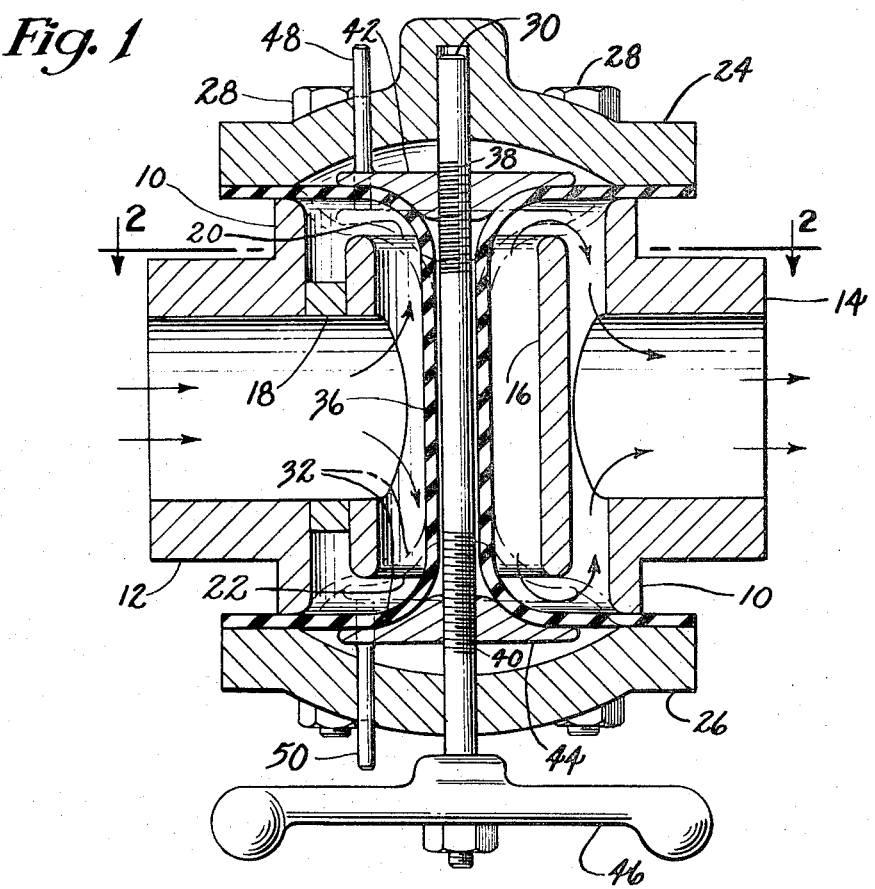
FIG. 1 is a vertical sectional view through a diaphragm valve of the present invention, showing a spool-shaped diaphragm in a valve open position in solid lines, and in a valve closed position in broken lines.
Figure 2:
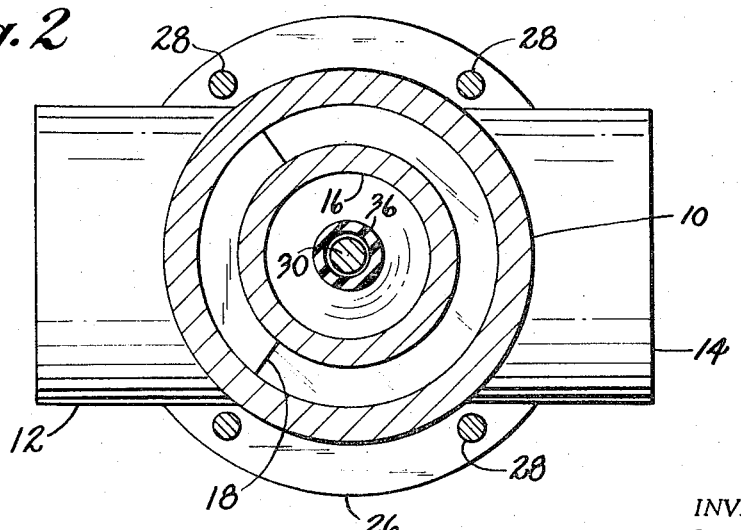
FIG. 2 is a horizontal sectional view taken along the line 2—2 of FIG. 1.

Turning now to the drawings in greater detail, and more particularly to the first sheet thereof wherein a first embodiment of the present invention is illustrated, FIG. 1 shows a valve housing having a generally cylindrical outer body portion 10 in which diametrically opposed inlet and outlet ports are defined in suitable bosses 12 and 14 respectively. An inner tubular body portion 16 is supported inside the outer body 10, being of a somewhat smaller diametrical size, and also somewhat shorter in axial extent than the outer body portion 10. As shown, the means for so supporting the tubular inner portion 16 preferably comprises an arcuate or crescent shaped spacer 18 which may be welded or otherwise attached to the body portions 10 and 16 by any well known method, or may comprise an integral part of these body portions in the event that the valve housing were made by an injection molding process. The arcuate spacer 18 has an outer surface which conforms to the internal bore of the outer body 10, and an inner surface which conforms to the outer cylindrical surface of the tubular inner body portion 16, and all of these parts define aligned openings which communicate with the inlet port as best shown in FIG. 1 so that the hollow interior of the tubular inner portion 16 defines a valve chamber communicating directly with the inlet port. A valve chamber associated with the outlet port is defined between the outer body portion 10 and the tubular inner body portion 16.

The tubular inner body portion 16 defines annular seating surfaces 20 and 22 at its opposite ends against which annular segments of a spool-shaped diaphragm valve element 32 are adapted to seat in a manner to be described in greater detail hereinbelow. It will be apparent, however, that in its closed position (shown in broken lines) the diaphragm 32 serves to isolate the valve chambers associated with the inlet and outlet ports respectively.

The cylindrical outer body portion 10 is provided with bonnets, or closures 24 and 26 at its upper and lower ends, respectively, and a plurality of bolts 28, 28 extend through these bonnets to close the open ends of the outer body portion and thereby define the complete valve housing. The upper bonnet 24 defines a generally concave inner surface with a centrally arranged axial cavity for rotatably receiving one end of a valve stem 30 to be described. The lower bonnet 26 also defines a generally concave inner surface with a centrally arranged axial opening for rotatably receiving the opposite end portion of the valve stem 30.

The diaphragm 32 is molded from an elastomeric material such as rubber or neoprene and is held in place between the bonnets 24 and 26 and the respective ends of the outer body portion 10 by the aforementioned bolts 28, 28. The diaphragm element is preferably spool-shaped having radially outwardly flared end portions which are adapted to be peripherally clamped in the foregoing manner, and with radially inwardly spaced annular segments thereof which are adapted to seat against the annular seating surfaces 20 and 22 when the valve element is deformed from the solid line position shown to the broken line position indicated in FIG. 1. The spool-shaped valve element also has a central portion 36 intermediate its flared end portions, which central portion 36 is annular in cross section so as to loosely receive the valve stem 30. The diaphragm valve element 32 is of substantially constant wall thickness and has open ends of bell-mouth shape which are adapted to be flexed between the open and closed positions shown in response to pressure exerted on the bell-mouth surface thereof in a manner which will now be described in detail. In accordance with the present invention, means is provided for flexing the flared end portions of the diaphragm toward one another to seat said annular segments thereof and thereby isolate the respective valve chambers defined in the valve housing.

With further reference to FIG. 1, the stem 30 will be seen to extend through the hollow central portion 36 of the diaphragm and to have its opposite ends rotatably supported in the bonnets 24 and 26 as described hereinabove. The upper end portion of the valve stem 30 includes a right-hand threaded portion 38 and a left-hand threaded portion 40 adjacent the radially outwardly flared end portions of the diaphragm respectively. Left and right hand threaded nuts, 42 and 44 respectively, are threadably received on the threaded portions 38 and 40 of the stem 30 so as to move toward and away from one another in response to rotation of the valve stem 30 by means of the hand wheel 46. Preferably, each of the nuts 42 and 44 is nonrotatably supported in its associated bonnet, 24 and 26 respectively, by means of a pin, 48 and 50, attached at one end to its associated nut and extending axially outwardly through an opening provided for this purpose in its associated bonnet. It will be apparent that each of the pins 48 and 50 also serves as an indicating device to illustrate to the observer the degree of closing or opening of the valve. Each of the nuts 42 and 44 defines an annular concave surface for engaging the flared end portions of the diaphragm.

Figure 3:
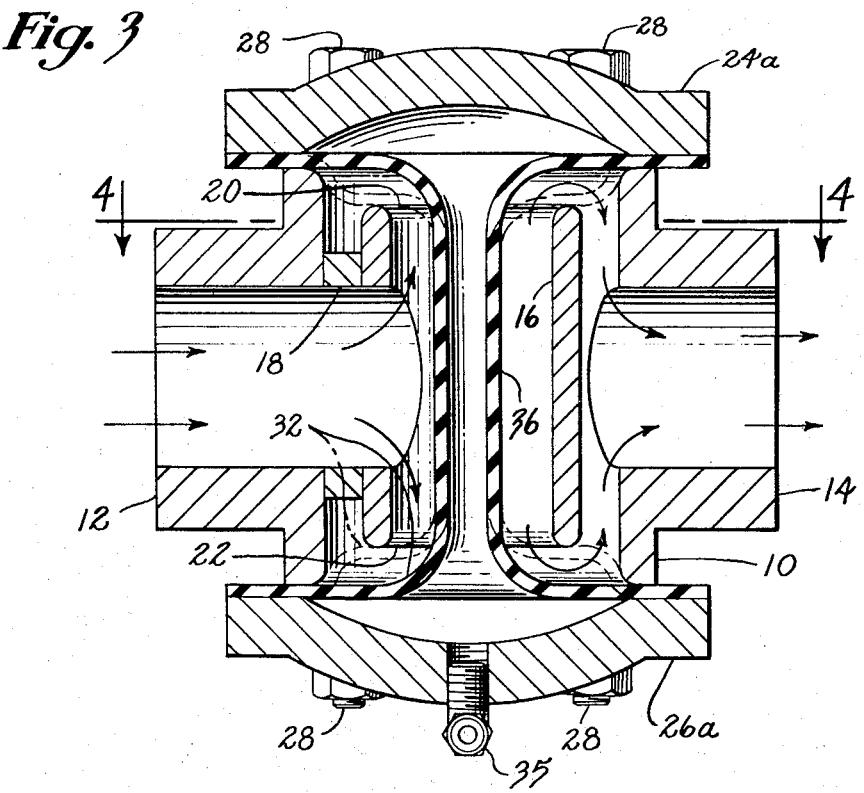
FIG. 3 is a vertical sectional view similar to FIG. 1, showing an alternative construction of the valve housing, but incorporating the same spool-shaped diaphragm shown in FIG. 1.
Figure 4:
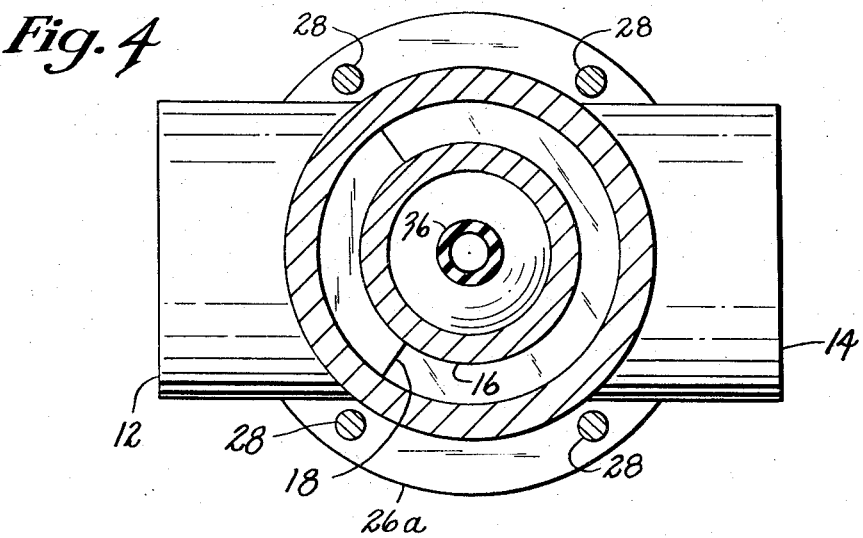
FIG. 4 is a horizontal sectional view taken along the line 4—4 of FIG. 3.

Turning now to the alternative embodiment depicted on the second drawing sheet, a valve housing similar to that of the previous embodiment is there shown having inner and outer body portions 16 and 10 respectively with a spacer 18 therebetween. A spool-shaped valve element of rubber is also provided, with its central portion located in the inner tubular portion 16. Outwardly flared end portions of the diaphragm are peripherally clamped to the ends of the outer body portion 10 by bonnets 24a and 26a respectively. Thus, annular segments of these diaphragm end portions are adapted to seat against the annular seating surfaces 20 and 22 defined at the ends of the inner tubular body portion 16 when the diaphragm is deformed axially from the solid line position to the broken line position shown in FIG. 3.

In place of the mechanical means for deforming the diaphragm described hereinabove with reference to the preceding embodiment, a single fitting 35 is provided in one of the bonnets 26a to admit air under pressure to the space between the concave inner surface of this bonnet 26a and the bell-mouth defining portion of the diaphragm end portion. As a result of the unique diaphragm construction, the same air pressure is also available at the opposite end of the diaphragm valve so that both end portions are seated in response to air pressure supplied at the single fitting 35.

I claim:

1. A diaphragm valve comprising an outer body defining a first valve chamber and a first port associated therewith, a tubular inner portion defining a second valve chamber and associated second port, said inner portion having annular seating surfaces at its opposite ends, a spool-shaped diaphragm element having a hollow central portion located in said tubular portion, radially outwardly flared end portions of said element peripherally attached to said outer body, said end portions having annular segments which are located in axially spaced relation to said annular seating surfaces respectively so that said first and second chambers are normally in communication with one another, and means for flexing said flared end portions toward one another to seat said segments on said seating surfaces and thereby isolate said first and second valve chambers.

2. A diaphragm valve as set forth in claim 1 and further characterized in that said outer body includes a generally tubular portion arranged around said tubular inner portion, and bonnets for said outer tubular portion, said bonnets serving to peripherally clamp said flared diaphragm end portions to the opposite ends of said tubular outer portion.

3. A diaphragm valve as set forth in claim 2 and further characterized in that said bonnets rotatably support the opposite ends of said stem respectively, said stem extending through said hollow central diaphragm portion and having left and right-hand threaded portions adjacent the flared end portions of said diaphragm, and left and right-hand threaded nuts nonrotatably held in said bonnets and threadably received on said threaded stem portions for engaging said diaphragm end portions respectively to urge said segments toward said annular seating surface in response to rotation of said stem in one direction.

4. A diaphragm valve as set forth in claim 2 and further characterized in that said means for flexing said diaphragm end portion comprises a fitting carried by one of said bonnets for connecting the hollow interior of said diaphragm element to a source of fluid under pressure.

5. A diaphragm valve as set forth in claim 3 and further characterized in that said diaphragm element is of substantially constant wall thickness having open ends of bell-mouth shape, said left and right-hand threaded nuts having concave surfaces for so engaging said inner bell-mouth surfaces, and an indicator pin carried by each nut opposite said concave surface and extending through an opening in its asociated bonnet so as to nonrotatably support said nuts in said bonnets.

6. A diaphragm valve as set forth in claim 5 and further characterized by a hand wheel on one end of said stem, which one end extends through its associated bonnet for receiving said hand wheel.

References Cited

UNITED STATES PATENTS

| | | | |
|---|---|---|---|
| 3,033,235 | 5/1962 | Thaning | 251—331 |
| 3,058,431 | 10/1962 | Eddy | 251—331 |

ARNOLD ROSENTHAL, *Primary Examiner.*

U.S. Cl. X.R.

137—625.28; 251—331, 61.1